(12) United States Patent
Kwak et al.

(10) Patent No.: US 6,476,895 B1
(45) Date of Patent: Nov. 5, 2002

(54) LIQUID CRYSTAL DISPLAY

(75) Inventors: Dong-Young Kwak, Daegu-shi (KR); Ki-Tae Kim, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 134 days.

(21) Appl. No.: 09/654,572

(22) Filed: Sep. 1, 2000

(30) Foreign Application Priority Data

Sep. 1, 1999 (KR) .............................. 99-36912

(51) Int. Cl.$^7$ .............................................. G06F 1/1375
(52) U.S. Cl. ........................................ 349/123; 379/152
(58) Field of Search .................................. 349/123, 152

(56) References Cited

U.S. PATENT DOCUMENTS

| | | | |
|---|---|---|---|
| 5,920,082 A | 3/1994 | Kitazawa et al. | |
| 5,641,974 A | 6/1997 | den Boer et al. | |
| 5,731,856 A | * 3/1998 | Kim et al. | 349/43 |
| 5,777,702 A | * 7/1998 | Wakagi et al. | 349/47 |
| 5,780,871 A | 7/1998 | den Boer et al. | |
| 5,811,318 A | * 9/1998 | Kweon | 349/152 |
| 5,825,439 A | * 10/1998 | Noriyama | 349/54 |
| 5,883,682 A | 3/1999 | Kim et al. | |
| 5,917,571 A | 6/1999 | Shimada | |
| 5,920,084 A | 7/1999 | Gu et al. | |
| 5,926,235 A | 7/1999 | Han et al. | |
| 5,955,744 A | 9/1999 | Gu et al. | |
| 5,956,105 A | 9/1999 | Yamazaki et al. | |
| 5,963,285 A | 10/1999 | Kim | |
| 5,986,378 A | 11/1999 | Caamano | |
| 6,001,539 A | 12/1999 | Lyu et al. | |
| 6,008,872 A | 12/1999 | den Boer et al. | |
| 6,034,747 A | 3/2000 | Tanaka et al. | |
| 6,038,008 A | 3/2000 | Kim et al. | |
| 6,091,466 A | 7/2000 | Kim et al. | |
| 6,091,470 A | 7/2000 | Fujikawa et al. | |
| 6,097,452 A | 8/2000 | Shimada et al. | |
| 6,097,454 A | 8/2000 | Zhang et al. | |
| 6,100,954 A | 8/2000 | Kim et al. | |
| 6,122,025 A | 9/2000 | Kim | |
| 6,172,733 B1 | * 1/2001 | Hong et al. | 349/152 |
| 6,211,534 B1 | * 4/2001 | Matsumoto | 349/152 |

* cited by examiner

Primary Examiner—James Dudek
(74) Attorney, Agent, or Firm—McKenna Long & Aldridge LLP

(57) ABSTRACT

A liquid crystal display includes an image display part including a gate line; a data line; a switching device connected electrically to the data and gate lines; an organic insulating layer having a contact hole and covering the switching device; and a pixel electrode on the organic insulating layer connected to the electrode of the switching device through the contact hole. A peripheral part surrounding the image display part includes wires and devices having gate and data pad links and electrostatic discharge devices, and a pattern isolated from the wires and devices, the pattern having a part that is exposed. An alignment layer covers the exposed part of the pattern.

16 Claims, 5 Drawing Sheets

LIQUID CRYSTAL DISPLAY

This application claims the benefit of Korean Patent Application No. 1999-36912, filed on Sep. 1, 1999, which is hereby incorporated by reference for all purposes as if fully set forth herein.

BACKGROUND OF THE INVENTION

1. Field of the Invention

The present invention relates to a liquid crystal display (hereinafter LCD), and more particularly, an LCD that uses an organic layer as a protection layer.

2. Discussion of the Related Art

An LCD includes a thin film transistor (TFT) array substrate having a plurality of pixels comprising switching devices and pixel electrodes. A color filter substrate comprises color filters corresponding to the respective pixels of the TFT array substrate and common electrodes thereon. Liquid crystals are inserted between the TFT array substrate and the color filter substrate to determine a transmissivity of a light by the voltage difference between the respective pixel electrodes and common electrodes.

An LCD includes a TFT array substrate such that a passivation layer covers switching devices, gate lines and data lines on the substrate. Pixel electrodes connected to the respective electrodes of the switching devices are formed over the passivation layer.

When a black matrix is formed on a color filter substrate of the above-mentioned LCD, the interval between the data line and the pixel electrode (a shading region on a light shielding region) may not be correctly overlapped with the black matrix due to a misalignment formed during the assembly of the TFT array substrate to the color filter substrate. The interval is needed because of a parasitic capacitance that is formed when the data line overlaps the pixel electrode. To solve the misalignment problem the black matrix is formed wider than needed to allow for a sufficient alignment margin. Thus, the aperture ratio is reduced due to the enlargement of the black matrix.

However, if the passivation layer is formed of an organic insulating material of low dielectric constant, the pixel electrode may overlap the data line, because a low dielectric constant will reduce a parasitic capacitance between the pixel electrode and data line. In this case, the aperture ratio is improved since a black matrix of narrow width may be formed.

FIG. 1 shows a schematic layout of a general TFT array substrate.

Referring to FIG. 1, data and gate lines (not shown in the drawing) are formed on a substrate. An image display part 11, where a plurality of switching devices and a plurality of pixels having pixel electrodes 10 are arranged is, located at the central part of the substrate. A peripheral part 12 surrounds the image display part 11. The peripheral part 12 includes a sealing substance for assembling the TFT array substrate and the color filter substrate, an electrostatic discharge protection circuit, gate pad links connected to gate pads, data pad links connected to data pads and the like.

A data pad part 13 which is to be connected to a driving circuit is formed at an upper side of the peripheral part 12. A gate pad part 14 which is to be connected to a gate driving circuit is formed at a left side of the peripheral part 12. The data pad part 13 and the gate pad part 14 are exposed after having been combined with the color filter substrate. Thus, the image display part 11 and the peripheral part 12 surrounding the image display part 11 are overlap the color filter with liquid crystals therebetween. An alignment layer for aligning liquid crystals is formed on the image display part 11 and the peripheral part 12.

FIG. 2 shows the state of an alignment layer located on an image display part and a peripheral part to explain an LCD according to a related art.

Referring to FIG. 2, known devices and wires of an LCD are formed such as gate lines, data lines, and switching devices (such as TFTs) in an image display part, and gate pad links, data pad links, electrostatic discharge protection devices in a peripheral part. These wires and devices are denoted in the drawing as a device layer 20 for simplification.

An organic insulating layer 21 as a passivation layer is formed to cover an entire exposed surface of the image display and peripheral parts. An electrode of each switching device is exposed by etching respective portions of the passivation layer. Then, a pixel electrode 23 is formed and connected to the exposed electrode of the switching device on the organic insulating layer 21 in the image display part.

After an alignment layer 24 formed of an organic material such as polyimide for alignment of liquid crystal molecules has been formed on the exposed surface of the image display and peripheral parts, the substrate is ready for being combined with a color filter substrate.

In the related art, the alignment layer 24 is formed to contact the pixel electrode 23 made of a transparent conductive substance on the image display part. The alignment layer 24 is also formed on the peripheral part and contacts the organic insulating layer 21. The alignment layer adheres to the transparent conductive layer better than to the organic insulating layer. Such adhesion tendency of the alignment layer relative to the attached substance presents a problem. For example, a portion of the alignment layer 24 formed in the peripheral part at the boundary between the image display and peripheral parts is pushed back in the direction of the pixel electrode 23 in the image display part to form a bump. This causes poor printing including irregular thickness of the alignment layer. Thus, the poorly printed alignment layer causes image stains on the display.

When the alignment layer is printed poorly, the bad part of the alignment layer is removed by dry etching, for example, and a new alignment layer is printed again for reproduction. Unfortunately, the organic insulating layer 21 under the poor alignment layer 29' may also be etched as shown in FIG. 3. The undesired etching changes the surface of the organic insulating layer 21. Moreover, the surface characteristics of the damaged organic insulating layer 21 deteriorates, resulting in poor adhesion to the alignment layer.

Accordingly, reformation or re-printing of the alignment layer to contact the poorly printed alignment layer still does not cure the problem because of over etching.

SUMMARY OF THE INVENTION

Accordingly, the present invention is directed to a liquid crystal display that substantially obviates one or more of the problems due to limitations and disadvantages of the related art.

An advantage of the present invention is to provide a liquid crystal display that improves the printing quality of an alignment layer in a peripheral part.

Another advantage of the present invention is to provide a liquid crystal display that improves the adhesion of an alignment layer to a previous layer.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention includes an image display part and a peripheral part wherein the image display part includes: a gate line, a data line crossing the gate line, a switching device connected electrically to the data and gate lines, an organic insulating layer covering an entire surface of the switching device and a pixel electrode on the organic insulating layer and connected to the electrode of the switching device through organic insulating layer; and the peripheral part includes: wires and devices including gate and data pad links and electrostatic discharge devices: and a pattern form is isolated from the wires and devices and an upper part of the pattern is exposed, and an alignment layer covering exposed surfaces of the pattern.

Preferably, the pattern is formed of the same wiring substance as the pixel electrode, the data line, and the gate line.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
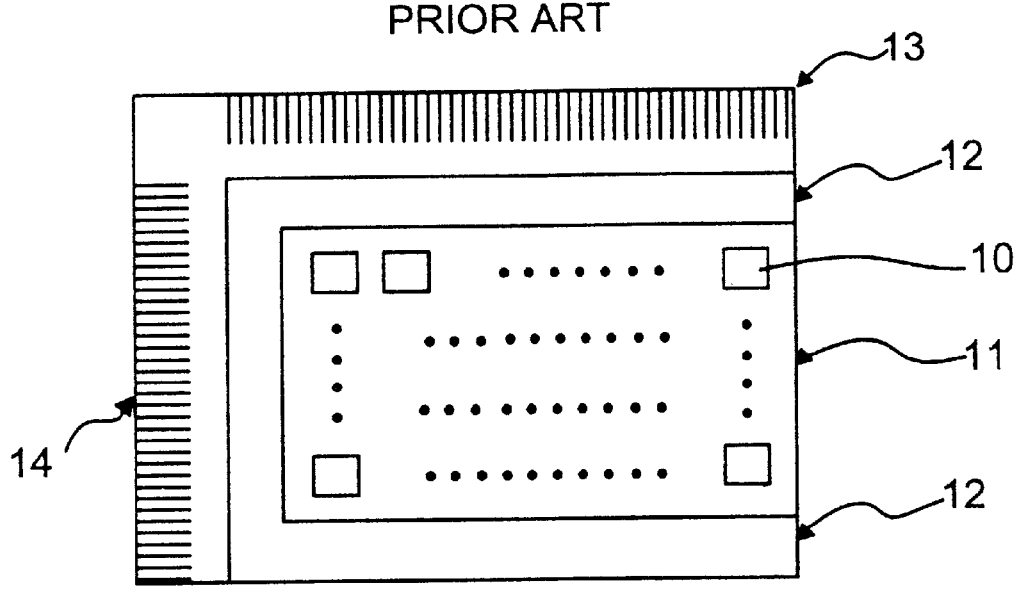
FIG. 1 shows a schematic layout of a general TFT array substrate.
Figure 2:
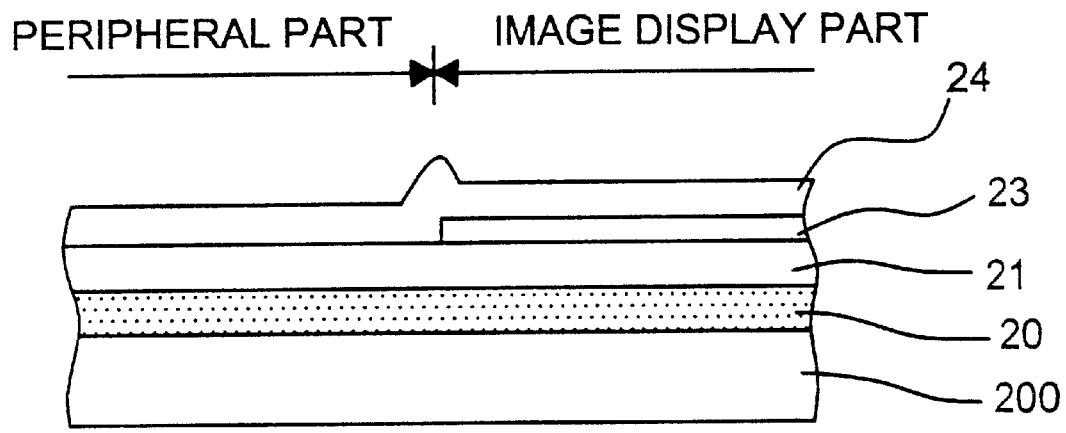
FIG. 2 shows the state of an alignment layer located on an image display part and a peripheral part of an LCD according to a related art.
Figure 3:
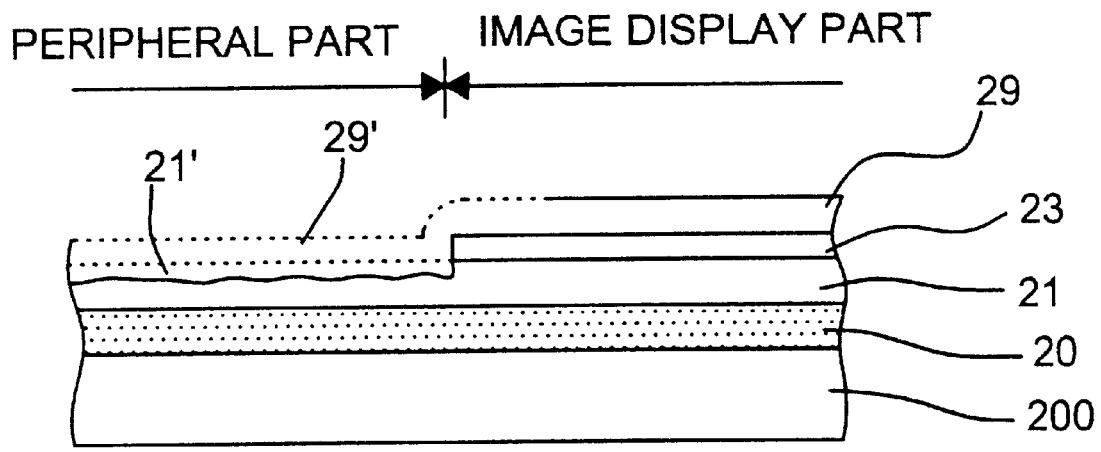
FIG. 3 shows a cross-sectional view of a damaged organic insulating layer on printing a new alignment layer in a liquid crystal display according to a related art.
Figure 4:
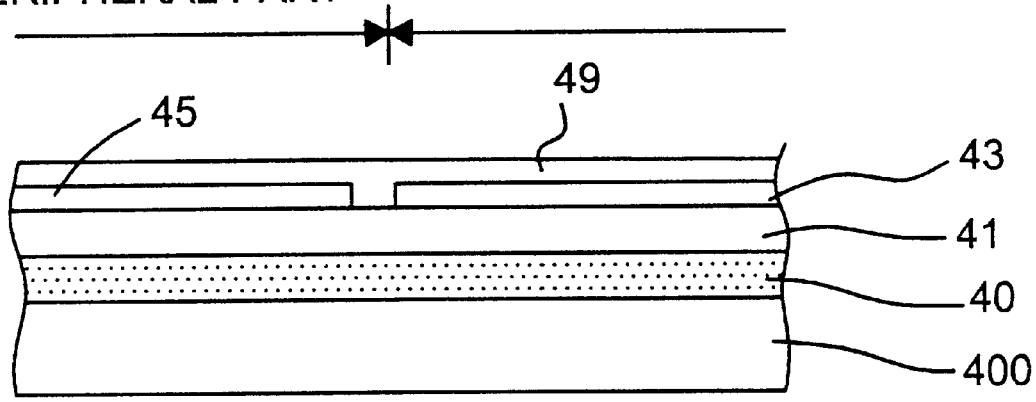
FIG. 4 shows a cross-sectional view of an LCD according to a first embodiment of the present invention.

FIG. 4 shows a cross-sectional view of an LCD according to a first embodiment of the present invention including a printed state of an alignment layer formed in an image display part and a peripheral part.

Referring to FIG. 4, known devices and wires of an LCD are formed such as gate lines, data lines, and switching devices (such as TFTs) in an image display part, and gate pad links, data pad links, electrostatic discharge protection devices in a peripheral part. These wires and devices are denoted in the drawing as a device layer 40 for simplification.

An organic insulating layer 41 as a passivation layer is formed to cover an entire exposed surface of the image display and peripheral parts.

Then, a pixel electrode 43 of a transparent conductive material is formed to be connected to the electrode of the switching device on the organic insulating layer 41 in the image display part. A pattern 45 for improving adhesion tendency to an alignment layer is formed of the same wire material as the pixel electrode 43. In particular, after a transparent conductive layer has been formed on the organic insulating layer 41, the pixel electrode 43 and the pattern 45 are formed by photolithography.

After an alignment layer 49 formed of an organic material such as polyimide for alignment of liquid crystal molecules has been printed on the exposed surface of the image display part and the peripheral part, the substrate is ready for being combined with a color filter substrate.

As mentioned above, the present invention enables the alignment layer to be printed on a transparent conductive material layer having a pattern for improving the adhesiveness to the alignment layer in the peripheral part as well as in the image display part. Therefore, problems associated with the printing quality of the alignment layer as in the related art where the alignment layer is printed directly on the organic insulating layer is minimized. When the alignment layer is printed incorrectly, the bad or undesired part of the alignment layer is removed by dry etching and a new alignment layer is printed again for reproduction.

Figure 5:
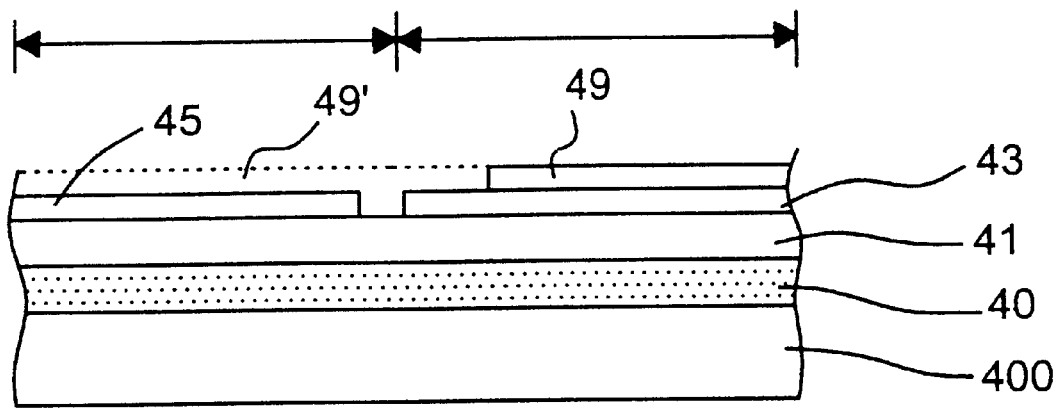
FIG. 5 shows a cross-sectional view of a pattern as an etch-stopper for improving adhesion to an alignment layer when the alignment layer is reprinted on an LCD according to the first embodiment of the present invention.

In the present invention, as shown in FIG. 5, the organic insulating layer 41 is protected by the pattern 45 from the etchant since the pattern 45 for improving the adhesiveness to an alignment layer covers the organic insulating layer 41. Here, 49' represents the etched portion of the alignment layer 49. Thus, the organic insulating layer 41 remains unetched during reproduction or re-printing of the alignment layer since the pattern 45 also acts as an etch-stopper.

Accordingly, compared to the related art, the present invention prevents the surface of an organic insulating layer from being damaged during the reproduction of an alignment layer as well as any deterioration of the alignment layer, thereby improving the reproduction of an alignment layer.

A pattern for improving the adhesion tendency or the adhesiveness to an alignment layer may be formed of known metal materials to improve the printing characteristics of an alignment layer which has a strong tendency to attach itself to a metal layer as well as to a transparent conductive layer.

Alternatively, a pattern for improving adhesion tendency to an alignment layer may be formed of a wire substance on a TFT array substrate, which will be explained through the second and third embodiments of the present invention.

Figure 6:
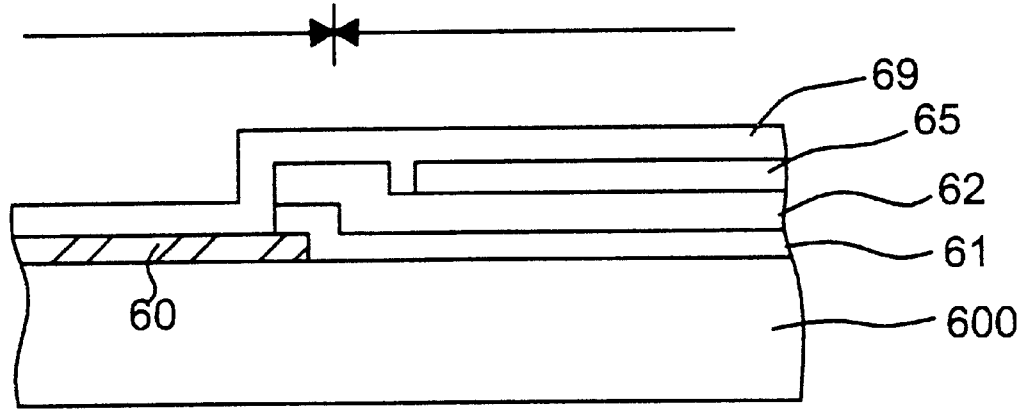
FIG. 6 shows a cross-sectional view of an LCD according to a second embodiment of the present invention.

FIG. 6 shows a cross-sectional view of an LCD according to a second embodiment of the present invention, and illustrating a cross-sectional view of an LCD of an ITO On Passivation (IOP) layer type to show the process of printing an alignment layer on an image display part and a peripheral part. The second embodiment of the present invention forms a pattern for improving the adhesion tendency to an alignment layer using a gate wire substance.

Referring to FIG. 6, wires and devices such as a gate line (not shown in the drawing), a gate insulating layer 61, a data line (not shown in the drawing), a thin film transistor and the like are formed on an insulating substrate 600 to fabricate an LCD by a general fabrication method.

In this case, a pattern 60 for improving the adhesion tendency to an alignment layer is formed using a metal layer for forming a gate line, for example. A gate line (not shown in the drawing) and the pattern 60 may be formed simultaneously by depositing a metal layer for forming a gate line on the insulating substrate 600. Photolithography is performed thereafter.

An organic insulating layer 62 as a passivation layer is formed to cover an entire exposed surface of the image display and peripheral parts. An electrode of each switching device is exposed, for example, by a contact hole formed in the passivation layer. Then, a pixel electrode 65 is formed on the organic insulating layer 62 in the image display part and connected to the electrode of the switching device through the contact hole.

Before printing an alignment layer 69 thereon, the pattern 60 is exposed by selectively etching the gate insulating layer 61 and the organic insulating layer 62 which preferably cover a portion of the pattern 60. Then, the alignment layer 69 is printed over an entire surface of the substrate including the pattern 60 and the pixel electrode 65.

Accordingly, the present invention improves the printing characteristics of an alignment layer in the peripheral part as well as in the image display part since the alignment layer is printed on the pattern 60 (for improving the adhesiveness to the alignment layer) and the pixel electrode 65 of a transparent conductive substance.

As a result, the problems of printing the alignment layer in the related art are minimized by the present invention.

Figure 7:
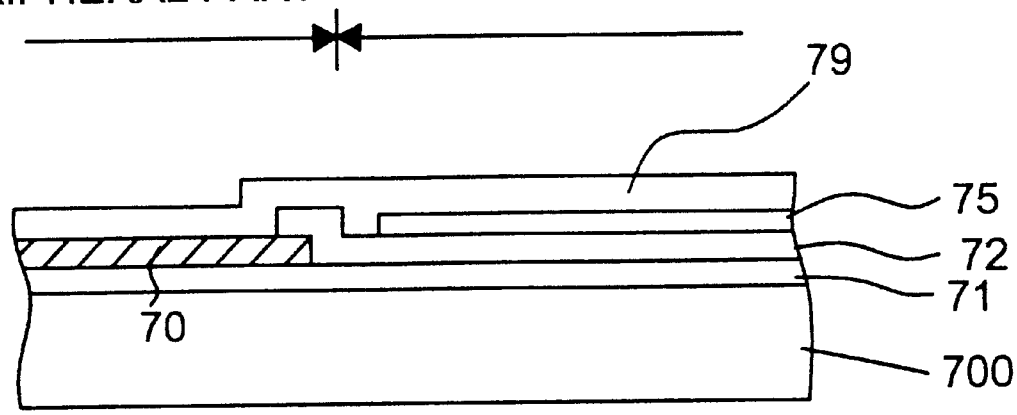
FIG. 7 shows a cross-sectional view of an LCD according to a third embodiment of the present invention.

FIG. 7 shows a cross-sectional view of an LCD according to a third embodiment of the present invention, and illustrating a cross-sectional view of an LCD of an IOP type to show the process of printing an alignment layer on an image display part and a peripheral part. The third embodiment of the present invention includes a pattern for improving the adhesiveness to an alignment layer using of a data wire substance.

Referring to FIG. 7, wires and devices such as a gate line (not shown in the drawing), a gate insulating layer 71, a data line (not shown in the drawing), a thin film transistor and the like are formed on an insulating substrate 700 to fabricate an LCD according to the third embodiment of the present invention by a general fabrication method.

In this case, a pattern 70 for improving the adhesion tendency to an alignment layer is formed using of a metal layer for forming a data line, for example. A data line (not shown in the drawing) and the pattern 70 may be formed simultaneously by depositing a metal layer for forming a data line on the gate insulating layer 71. Photolithography is performed thereafter.

An organic insulating layer 72 as a passivation layer is formed to cover an entire exposed surface of the image display and peripheral parts. An electrode of each switching device is exposed, for example, by a contact hole formed in the passivation layer. Then, a pixel electrode 75 is formed on the organic insulating layer 72 in the image display part and connected to the electrode of the switching device through the contact hole.

Before printing an alignment layer 79 thereon, the pattern 70 is exposed by selectively etching the organic insulating layer 72 which preferably cover the portion of the pattern 70. Then, the alignment layer 79 is printed over an entire surface of the substrate including the pattern 70 and the pixel electrode 75.

Accordingly, the present invention improves the printing characteristics of an alignment layer in the peripheral part as well as in the image display part since the alignment layer 79 is printed on the pattern 70 (for improving the adhesiveness to the alignment layer) and the pixel electrode 75 of a transparent conductive substance.

As a result, the problems of printing the alignment layer in the related art are minimized by the present invention.

The above-described embodiments of the present invention are applied to an IOP type LCD wherein a pixel electrode is placed on a passivation layer of an organic insulating layer.

However, the present invention can be applied to other types of LCD structures.

Figure 8A:
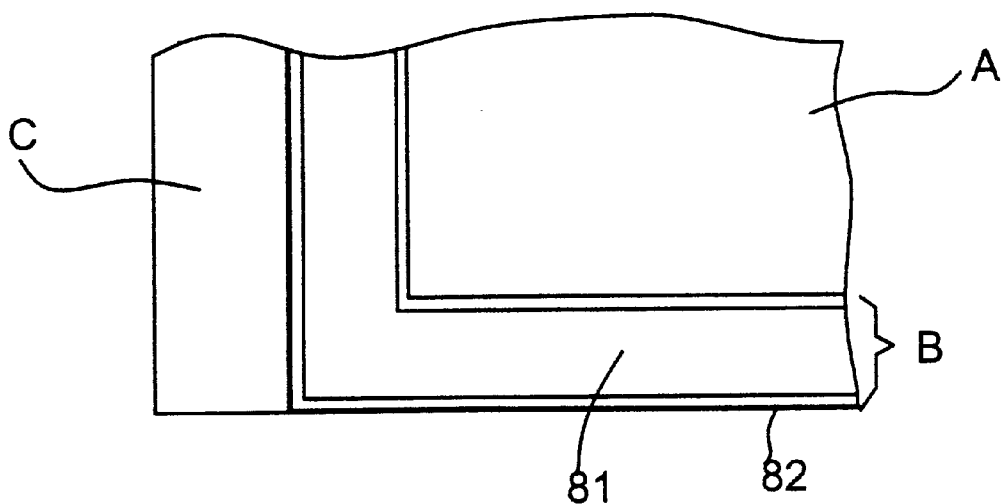
FIGS. 8A to 8C show patterns for improving adhesion to an alignment layer in an LCD according to the embodiments of the present invention.
Figure 8B:
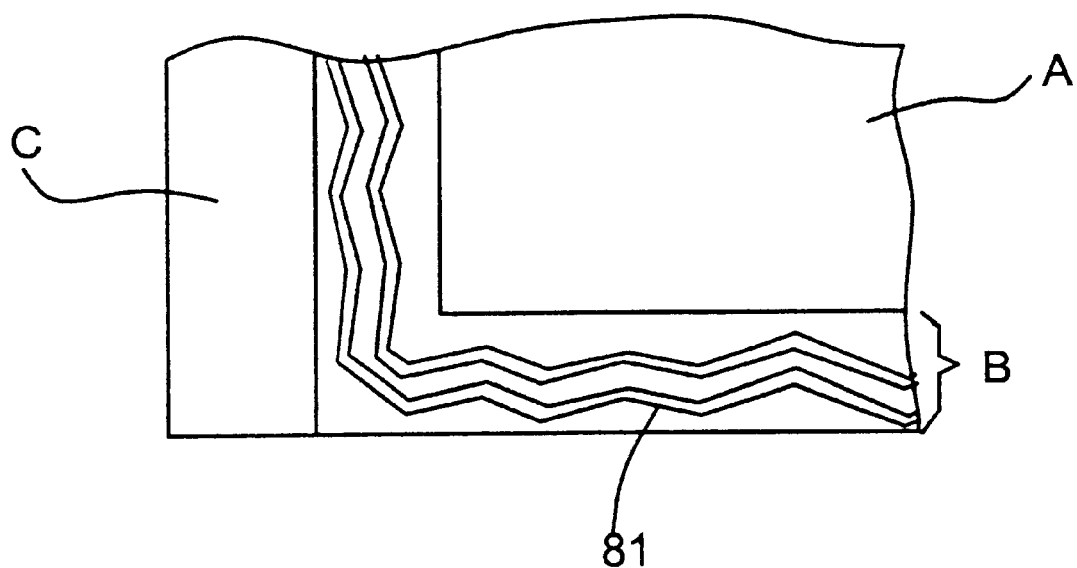
Figure 8C:
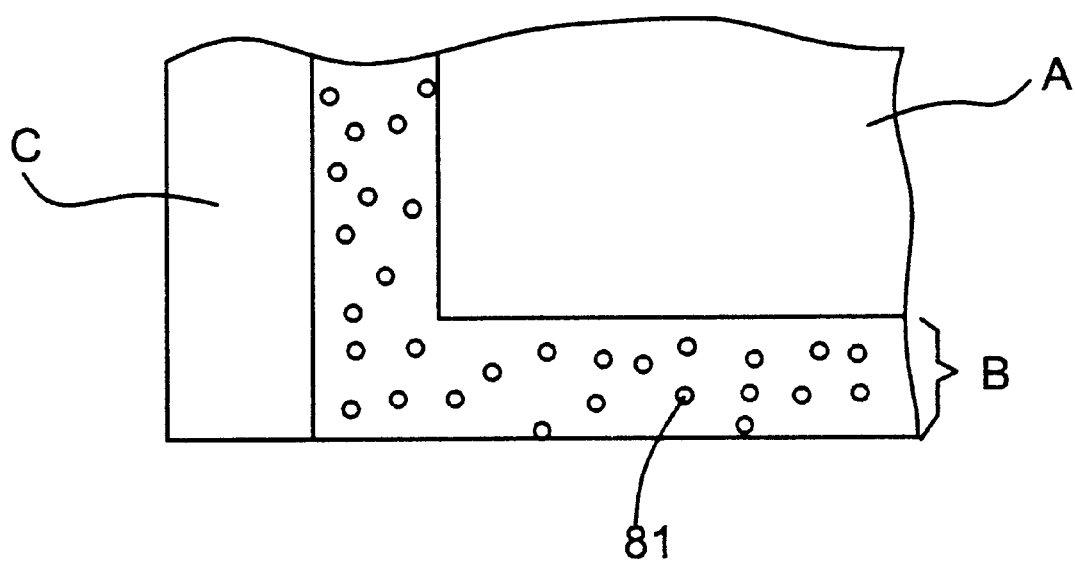

The present invention improves the printing characteristics of an alignment layer by forming a layer with a substance having a good adhesive tendency, i.e., a transparent conductive substance or a metal, before printing the alignment layer. Various patterns for improving adhesion to an alignment layer are proposed by the present invention, which are shown in FIGS. 8A to 8C. FIGS. 8A to 8C show schematic patterns for improving adhesion to an alignment layer in an LCD according to the present invention.

Referring to FIG. 8A, a first example of a pattern for improving adhesion to an alignment layer is to print a pattern 81 for improving adhesion to an alignment layer that covers an entire or substantially the entire surface of a peripheral part B. In this case, the pattern 81 should be electrically isolated from wires such as gate pad and data pad links and from devices such as ESD protection circuit and the like. Thus, the pattern 81 is formed to be separated from the wires and devices.

Moreover, it is preferable not to place the pattern 81 on a sealing part 82, which is used for combining with a color filter substrate, to prevent the color filter substrate from an electrical short due to conductive particles.

Referring to FIG. 8B, a second example of a pattern for improving adhesion to an alignment layer is to form a pattern 81 of an arbitrary form on a peripheral part B.

Instead of being formed on an entire surface of the peripheral part B, the pattern 81 is formed to occupy a predetermined area of the peripheral part while preventing the alignment layer from being rolled back to an image display part A from the peripheral part B. The rolling effect of the alignment layer is prevented efficiently when the pattern 81 is formed to be perpendicular to the rolling direction of the alignment layer.

Referring to FIG. 8C, a third example of a pattern for improving adhesion to an alignment layer is to form a pattern 81 of small forms of shapes that are distributed on an entire surface of the peripheral part B. The pattern 81 of FIG. 8C also prevents the alignment layer from being rolled back to an image display part A from the peripheral part B.

The present invention improves the printing of an alignment layer by forming a layer beneath the alignment layer using a substance with good adhesion properties relative to the alignment layer, such as a transparent conductive substance or a metal.

Accordingly, the present invention prevents poor printing of an alignment layer especially at the boundary between an image display part and a peripheral part by forming an underlayer having an excellent adhesive property to the alignment layer. As a result, the present invention provides an LCD of which image quality is excellent by minimizing the alignment problems due to poor printing.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:
    an image display part including:
        a gate line;
        a data line;
        a switching device connected electrically to the data and gate lines;
        an organic insulating layer having a contact hole and covering the switching device; and
        a pixel electrode on the organic insulating layer connected to the electrode of the switching device through the contact hole;
    a peripheral part surrounding the image display part, the peripheral part including:
        wires and devices including gate and data pad links and electrostatic discharge devices and
        a pattern is isolated from the wires and devices, the pattern having a part that is exposed; and
        an alignment layer covering the exposed part of the pattern.

2. The liquid crystal display according to claim 1, wherein the pattern is made of the same wiring substance as the pixel electrode.

3. The liquid crystal display according to claim 1, wherein the pattern is made of the same wiring substance as the data line.

4. The liquid crystal display according to claim 1, wherein the pattern is made of the same wiring substance as the gate line.

5. The liquid crystal display according to claim 1, wherein the pattern is formed throughout the peripheral part.

6. The liquid crystal display according to claim 2, wherein the pattern is formed throughout the peripheral part.

7. The liquid crystal display according to claim 3, wherein the pattern is formed throughout the peripheral part.

8. The liquid crystal display according to claim 4, wherein the pattern is formed throughout the peripheral part.

9. The liquid crystal display according to claim 5, wherein the pattern is substantially electrically isolated from a sealing portion in the peripheral part.

10. The liquid crystal display according to claim 6, wherein the pattern is substantially electrically isolated from a sealing portion in the peripheral part.

11. The liquid crystal display according to claim 7, wherein the pattern is substantially electrically isolated from a sealing portion in the peripheral part.

12. The liquid crystal display according to claim 8, wherein the pattern is substantially electrically isolated from a sealing portion in the peripheral part.

13. The liquid crystal display according to claim 1, wherein the pattern includes an arbitrary form in an area of the peripheral part.

14. The liquid crystal display according to claim 2, wherein the pattern includes an arbitrary form in an area of the peripheral part.

15. The liquid crystal display according to claim 3, wherein the pattern includes an arbitrary form in an area of the peripheral part.

16. The liquid crystal display according to claim 4, wherein the pattern includes an arbitrary form in an area of the peripheral part.

* * * * *